Patented Aug. 16, 1949

2,478,989

UNITED STATES PATENT OFFICE 2,478,989

CHEMICAL PROCESS FOR THE PRODUCTION OF ACROLEIN

Joseph Frederic Walker, Westfield, N. J., assignor to E. I. du Pont de Nemours & Company, Wilmington, Del., a corporation of Delaware No Drawing. Application June 26, 1946, Serial No. 679,555

7 Claims. (Cl. 260—601)

This invention relates to the production of acrolein and related products. Acrolein is commonly produced from glycerol by heating the same in the presence of a substance such as potassium bisulfate or orthophosphoric acid, or by the oxidation of allyl alcohol. The above-mentioned materials heretofore used for the production of acrolein by the said methods are not always readily obtainable in the desired quantities and the processes involved are inconvenient to carry out.

It is an object of this invention to produce acrolein and related products by a new process.

It is a further object of this invention to produce acrolein and related products from formaldehyde and vinyl acetate.

It is yet another object of this invention to produce the triacetate of hydracrylic aldehyde and allylidene diacetate and, as an intermediate, acrolein.

Other objects of the invention will appear hereinafter.

The objects of this invention may be accomplished, in general, by reacting formaldehyde with vinyl acetate in a fatty acid solvent containing a strong mineral acid to produce acrolein, and acetylating the above-said reaction products to produce the triacetate of hydracrylic aldehyde and allylidene diacetate.

The formaldehyde used in the reaction is preferably in the form of paraformaldehyde, although other formaldehyde polymers which yield formaldehyde under acid conditions, e. g., trioxane and polyoxymethylene ethers, as well as strong aqueous formaldehyde solutions, i. e., solutions having a strength of at least 55% by weight, can also be used. Throughout the specification and claims, the term "formaldehyde" is intended to include formaldehyde whether added as such or formed, in situ, in the reaction medium. The formaldehyde and vinyl acetate are preferably used in equimolar proportions.

As a fatty acid solvent, acetic acid is preferred by reason of its efficient action and cheapness. Other lower fatty acids, for example, formic acid, propionic acid, and butyric acids can also be used as a solvent medium. The amount of solvent used is not material; however, it is preferred to use an amount between 10% and 80% of the total weight of the reactants.

As strong mineral acids, sulfuric acid, phosphoric acid, and hydrochloric acid can be used in carrying out the reaction of this invention. Phosphoric acid is preferred because of the higher yields obtained thereby. The mineral acid may be used in amount between 0.1% and 40% of the weight of the reactants used.

In accordance with the preferred method of carrying out the process of this invention, the acetic acid (glacial) is first admixed with the strong mineral acid and the formaldehyde and the vinyl acetate then added dropwise to the other reactants. This particular order of mixing the various reactants is not, however, essential. If desired, the several reactants may all be mixed with each other at the same time. It is also preferred, but not essential, to add to the reactants a substance which will prevent or retard the polymerization of acrolein, for example, cupric oxide. It is preferred to carry out the reaction at a temperature between 25° C. and 60° C. Reaction temperatures between 20° C. and 120° C. may, however, be employed.

The reaction between the formaldehyde and vinyl acetate is believed to take place in a somewhat complex manner. Although I do not wish to be restricted in my invention to any particular theory as to how the reactants react to produce the products of the reaction, the observations made during the carrying out of the process appear to support the following series of reactions:

The simple addition products of formaldehyde and the mineral acid catalyst (e. g., sulfuric acid) probably adds to vinyl acetate as follows;

(1) 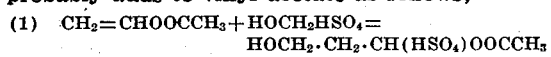

This addition product splits off sulfuric acid and acetic acid on heating to give acrolein;

(2) 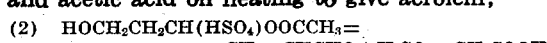

If the sulfuric acid is first split off by neutralization with alkali, e. g., sodium hydroxide or an alkali acetate, acrolein is obtained by splitting off of water and acetic acid;

(3) 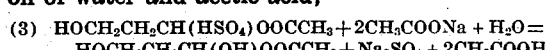

(4) 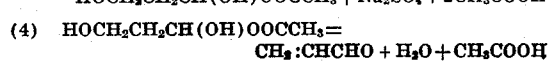

Acetylation of the product obtained in (3) has been found to give hydracrylic aldehyde triacetate or allylidene diacetate (acrolein diacetate) depending on whether or not a molecule of water is split off. Both of these products have been obtained by acetylation with acetic anhydride of the reaction mixture after treatment with an alkali acetate;

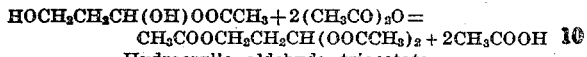

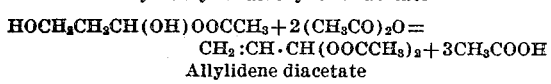

The following examples are given to illustrate, in detail, certain preferred methods of practicing the invention, it being understood that the invention is not to be limited to the details set forth therein.

EXAMPLE I

*Preparation of acrolein with paraformaldehyde and vinyl acetate using phosphoric acid as catalyst*

A mixture of 180 grams of acetic acid, 99 grams of paraformaldehyde, 21 grams of phosphoric acid, and one gram of cupric oxide was placed in a one-liter three-neck flask fitted with an agitator, thermometer, and dropping funnel. The mixture was then heated with agitation to 60° C. and 258 grams of vinyl acetate gradually added through the dropping funnel. After reacting for two hours at 60° C., the mixture was distilled to dryness and the acrolein (B. P. 52.5° C.) isolated by fractionation of the distillate. A yield of 102 grams of acrolein or 61% of the theoretical was obtained. The cupric oxide used in this preparation serves as a stabilizer to prevent polymerization of acrolein.

EXAMPLE II

*Preparation of acrolein with paraformaldehyde and vinyl acetate using sulfuric acid as catalyst*

A mixture of 200 grams of glacial acetic acid, 93 grams of paraformaldehyde, 20 grams of concentrated sulfuric acid, and one gram of cupric oxide was placed in a one-liter flask fitted with a thermometer, agitator, and dropping funnel. The mixture was cooled to 15° C. and 258 grams of vinyl acetate was added dropwise with good agitation. An exothermic reaction resulted but the temperature was kept in the neighborhood of 25° C. After all the vinyl acetate had been added, the reaction was allowed to continue for an additional hour and the mixture was then treated with 40% sodium hydroxide equivalent to the sulfuric acid charged. The reaction mixture was then distilled through a fractionating column at atmospheric pressure. The first fraction obtained consisted of 62 grams of crude arcolein.

EXAMPLE III

*Preparation of acrolein from vinyl acetate and 60% formaldehyde solution*

One hundred (100) grams of 60% formaldehyde solution was added to a mixture of 120 grams of acetic acid and 30 grams of concentrated sulfuric acid. Vinyl acetate in the amount of 172 grams was then slowly added to the mixture, holding the temperature at approximately 25° C. The reaction was then allowed to continue at 40-43° C. until no more heat was evolved. The reaction mixture was then mixed with 400 cc. of distilled water and saturated with sodium sulfate. An oily layer was removed and the aqueous phase was then subjected to distillation. A small yield of acrolein contaminated with unreacted vinyl acetate was obtained.

EXAMPLE IV

*Preparation of hydracrylic aldehyde triacetate and allylidene diacetate from paraformaldehyde and vinyl acetate*

One hundred and twenty-nine grams (129 g.) of vinyl acetate, 45 grams of paraformaldehyde, 100 grams of acetic acid, and 11 grams of phosphoric acid were mixed together in a one-liter flask equipped with a reflux condenser and refluxed for one-half hour. Twenty-three (23) grams of acetic anhydride was then added and the mixture refluxed for an additional two hours. The reaction mixture was then treated with 300 cc. of distilled water and saturated with calcium chloride. The non-aqueous phase was then removed and the aqueous phase extracted with methylene chloride. This extract was combined with the non-aqueous phase and this mixture dried with anhydrous sodium sulfate. The methylene chloride was removed by distillation and the residual material refluxed with 400 grams of acetic anhydride for six hours. On distillation of the final reaction mixture, the following products were isolated: acrolein—31 grams; vinyl acetate—8 grams; crude allylidene diacetate—27 grams; crude hydracrylic aldehyde triacetate—23 grams. The triacetate of hydracrylic aldehyde is a new compound not previously described in the literature. It is a colorless liquid, distilling in the range 130–135° C. at 10 mm. pressure. On refluxing with 60% sulfuric acid it is converted to acrolein. Molecular weight and saponification numbers, as compared with the theoretical values for this product, are shown below:

|  | Found | Theory for $CH_3COOCH_2CH_2CH(OOCCH_3)_2$ |
|---|---|---|
| Sap. No. | 70 | 73 |
| Approx. Mol. Wt. | 207 | 218 |

Reference in the specification and claims to parts, proportions and percentages, unless otherwise specified, refers to parts, proportions and percentages by weight.

Since it is obvious that many changes and modifications can be made in the above-described details without departing from the nature and spirit of the invention, it is to be understood that the invention is not be limited to said details except as set forth in the appended claims.

What is claimed is:

1. The process which comprises mixing vinyl acetate and formaldehyde in substantially equimolar proportions in a lower fatty acid solvent containing a strong mineral acid whereby to produce acrolein, said formaldehyde containing less than 45% by weight of water.

2. The process which comprises mixing vinyl acetate and formaldehyde in substantially equimolar proportions in a lower fatty acid solvent containing 0.1% to 40% by weight of a strong mineral acid whereby to produce acrolein, said formaldehyde containing less than 45% by weight of water.

3. The process which comprises mixing formaldehyde with a lower fatty acid solvent containing 0.1% to 40% by weight of a strong mineral acid, and adding thereto, in an amount substantially equimolar with the formaldehyde, vinyl acetate whereby to produce acrolein, said formaldehyde containing less than 45% by weight of water.

4. The process which comprises mixing formaldehyde with acetic acid containing between 0.1% and 40% by weight of a strong mineral acid, and adding thereto, in an amount substantially equimolar with the formaldehyde, vinyl acetate whereby to produce acrolein, said formaldehyde containing less than 45% by weight of water.

5. The process which comprises mixing formaldehyde with acetic acid containing between 0.1% and 40% by weight of phosphoric acid, and adding thereto, in an amount substantially equimolar with the formaldehyde, vinyl acetate whereby to produce acrolein, said formaldehyde containing less than 45% by weight of water.

6. The process of claim 5 in which the formaldehyde is in the form of paraformaldehyde.

7. The process of claim 5 in which the reaction is carried out in the presence of cupric oxide.

JOSEPH FREDERIC WALKER.

REFERENCES CITED

The following references are of record in the file of this patent:

UNITED STATES PATENTS

| Number | Name | Date |
|---|---|---|
| 1,714,783 | Hermann et al. | May 28, 1929 |
| 2,294,955 | Brant I | Sept. 8, 1942 |
| 2,393,740 | Brant et al., II | Jan. 29, 1946 |
| 2,402,133 | Gresham et al. | June 18, 1946 |

FOREIGN PATENTS

| Number | Country | Date |
|---|---|---|
| 513,772 | Great Britain | Oct. 20, 1939 |

OTHER REFERENCES

Fischer et al., "Berichte," vol. 62, page 862.

Rovira et al., "Chem. Abstracts," vol. 38 (1944), page 2012.

Serial No. 272,852, Walter (A. P. C.), published July 13, 1943.